United States Patent
Wong et al.

(10) Patent No.: US 9,722,732 B2
(45) Date of Patent: Aug. 1, 2017

(54) METHOD AND APPARATUS FOR TERMINATING REPETITION OF DATA PACKET TRANSMISSION

(71) Applicant: Alcatel Lucent, Boulogne-Billancourt (FR)

(72) Inventors: Shin Horng Wong, Chippenham (GB); Matthew Baker, Canterbury (GB); Sigen Ye, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 225 days.

(21) Appl. No.: 14/497,642

(22) Filed: Sep. 26, 2014

(65) Prior Publication Data

US 2016/0094314 A1 Mar. 31, 2016

(51) Int. Cl.
| | | |
|---|---|---|
| *H04L 1/16* | (2006.01) | |
| *H04L 12/825* | (2013.01) | |
| *H04W 72/04* | (2009.01) | |
| *H04W 4/00* | (2009.01) | |
| *H04L 1/18* | (2006.01) | |
| *H04W 84/04* | (2009.01) | |

(52) U.S. Cl.
CPC ............ *H04L 1/1657* (2013.01); *H04L 1/189* (2013.01); *H04L 1/1858* (2013.01); *H04L 47/26* (2013.01); *H04W 4/005* (2013.01); *H04W 72/0406* (2013.01); *H04W 84/042* (2013.01)

(58) Field of Classification Search
CPC ...... H04L 1/1657; H04L 47/26; H04W 4/005; H04W 72/0406; H04W 84/042
See application file for complete search history.

(56) References Cited

U.S. PATENT DOCUMENTS

| | | | | |
|---|---|---|---|---|
| 2004/0037245 A1* | 2/2004 | Grilli | ............... | H04L 1/0045 370/331 |
| 2004/0081124 A1* | 4/2004 | Black | ............... | H04L 1/1819 370/335 |

(Continued)

FOREIGN PATENT DOCUMENTS

| | | |
|---|---|---|
| CN | 102104469 A | 6/2011 |
| GB | 2 507 528 A | 5/2014 |

(Continued)

OTHER PUBLICATIONS

Office Action dated Oct. 4, 2016 in Taiwanese Application No. 104129206.

(Continued)

*Primary Examiner* — Charles C Jiang
*Assistant Examiner* — Thad Defauw
(74) *Attorney, Agent, or Firm* — Harness, Dickey & Pierce, P.L.C.

(57) ABSTRACT

In one embodiment, the method includes first determining, at a device, whether a data packet is successfully decoded after a first number of data packet repetitions have been received. Here, the first number is less than a total number of data packet repetitions to be sent to the device. The method further includes first sending, by the device, an acknowledgement if the first determining determines the data packet was successfully decoded, the first sending occurring before the total number of data packet repetitions has been received.

20 Claims, 5 Drawing Sheets

(56) References Cited

U.S. PATENT DOCUMENTS

2006/0018259 A1* 1/2006 Kadous ................ H04L 1/1829
 370/236
2008/0019303 A1* 1/2008 Baek ..................... H04L 5/0058
 370/328
2011/0228863 A1* 9/2011 Papasakellariou .... H04L 1/0031
 375/259

FOREIGN PATENT DOCUMENTS

| TW | 201421933 A | 6/2014 |
| WO | WO-2010/034354 A1 | 4/2010 |
| WO | WO-2014/067488 A1 | 5/2014 |

OTHER PUBLICATIONS

International Search Report dated Jan. 20, 2016 in International Application No. PCT/IB2015/001929.

* cited by examiner

METHOD AND APPARATUS FOR TERMINATING REPETITION OF DATA PACKET TRANSMISSION

BACKGROUND OF THE INVENTION

Generally, a Machine Type Communication (MTC) device is a user equipment (UE) that is used by a machine for a specific application. An example of an MTC device is a smart meter. Some of these smart meters are located in basements, which suffer from high penetration loss and therefore it is difficult for the MTC device to communicate with the network.

Repetition of physical channels is the main mechanism to extend the coverage of MTC UEs. The number of repetitions are expected to be significant (i.e., possibly hundreds of repetitions). Repetitions would reduce spectral efficiency and due to this, several coverage levels have been suggested such that UEs at a lower coverage level (i.e., closer to a base station or enhanced NodeB (eNB)) would require less repetitions compared to those that are at a higher coverage level. Improvement to the spectral efficiency is therefore highly beneficial.

SUMMARY OF THE INVENTION

At least one embodiment is directed to a method for terminating repetition of data packet transmission.

In one embodiment, the method includes first determining, at a device, whether a data packet is successfully decoded after a first number of data packet repetitions have been received. Here, the first number is less than a total number of data packet repetitions to be sent to the device. The method further includes first sending, by the device, an acknowledgement if the first determining determines the data packet was successfully decoded, the first sending occurring before the total number of data packet repetitions has been received.

In another embodiment, the method includes starting, at a device, a transmission operation to send a data packet. Here, the transmission operation is for sending the data packet for a first number of repetitions. The method further includes first determining, at the device, whether an acknowledgement has been received after a second number of repetitions of the data packet have been sent, where the second number being less than the first number; and first terminating, by the device, the transmission operation before reaching the first number of repetitions if the first determining determines that the acknowledgement has been received.

At least one embodiment relates to an apparatus for terminating repetition of data packet transmission.

In one embodiment, the apparatus includes a processor configured to first determine whether a data packet is successfully decoded after a first number of data packet repetitions have been received. Here, the first number is less than a total number of data packet repetitions to be sent to the device. The processor configured to first send an acknowledgement if the processor determines the data packet was successfully decoded, the first sending occurring before the total number of data packet repetitions has been received.

In another embodiment, the apparatus includes a processor configured to start a transmission operation to send a data packet. Here, the transmission operation is for sending the data packet for a first number of repetitions. The processor configured to first determine whether an acknowledgement has been received after a second number of repetitions of the data packet have been sent, where the second number being less than the first number; and the processor configured to terminate the transmission operation before reaching the first number of repetitions if the processor determines that the acknowledgement has been received.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
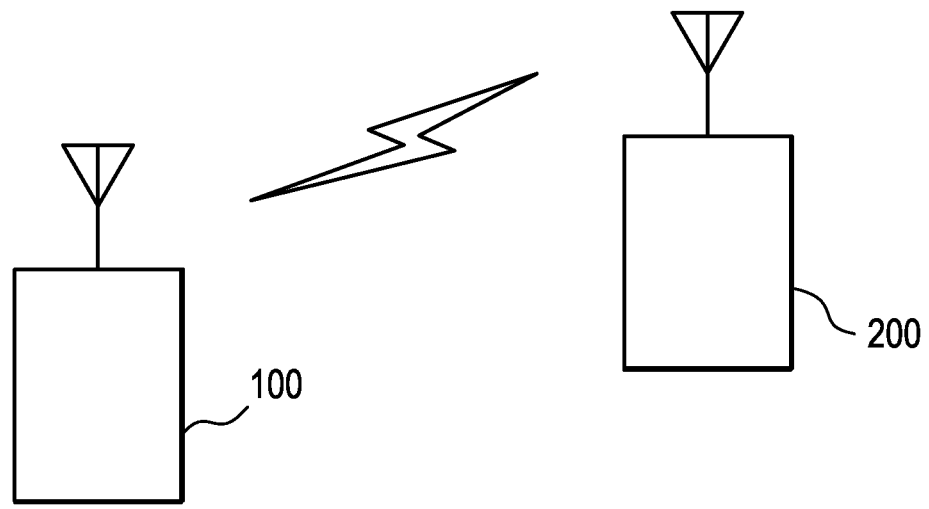
FIG. 1 illustrates wireless communication according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" may be synonymous to a mobile user, mobile station, mobile terminal, terminal, user, subscriber, wireless terminal, and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs (eNodeB or eNBs), access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

FIG. 1 illustrates wireless communication according to an example embodiment. As shown, a first device 100 communicates wirelessly with a second device 200. For example, in a wireless network, the first device 100 may be a base station or eNB and the second device 200 may be a UE. And while example embodiments will be described using this example, the present invention is not limited to this example.

Figure 2:
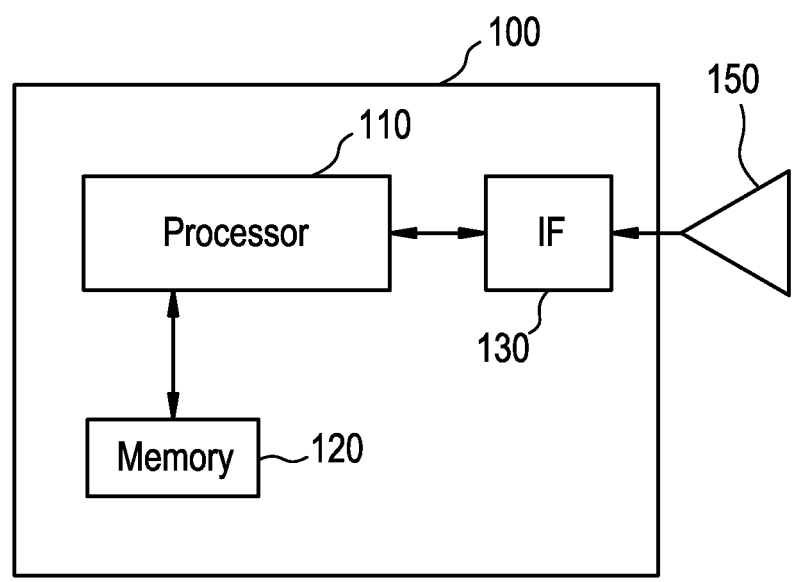
FIG. 2 illustrates one example of the eNB in FIG. 1 according to an example embodiment.

FIG. 2 illustrates one example of the eNB 100. As shown, the eNB 100 includes a processor 110, connected to a memory 120, various interfaces 130, and an antenna 150. As will be appreciated, depending on the implementation of the eNB 100, the eNB 100 may include many more components than those shown in FIG. 2. However, it is not necessary that all of these generally conventional components be shown in order to disclose the illustrative embodiment.

Memory 120 may be a computer readable storage medium that generally includes a random access memory (RAM), read only memory (ROM), and/or a permanent mass storage device, such as a disk drive. Memory 120 also stores operating system and any other routines/modules/applications for providing the functionalities of the eNB 100 (e.g., functionalities of a base station, methods according to the example embodiments, etc.). These software components may also be loaded from a separate computer readable storage medium into memory 120 using a drive mechanism (not shown). Such separate computer readable storage medium may include a disc, tape, DVD/CD-ROM drive, memory card, or other like computer readable storage medium (not shown). In some embodiments, software components may be loaded into memory 120 via one of the various interfaces 130, rather than via a computer readable storage medium.

Processor 110 may be configured to carry out instructions of a computer program by performing the basic arithmetical, logical, and input/output operations of the system. Instructions may be provided to processor 110 by memory 120.

The various interfaces 130 may include components that interface the processor 110 with an antenna 150, or other input/output components. As will be understood, the interfaces 130 and programs stored in the memory 120 to set forth the special purpose functionalities of the eNB 100 will vary depending on the implementation of the first device.

Figure 3:
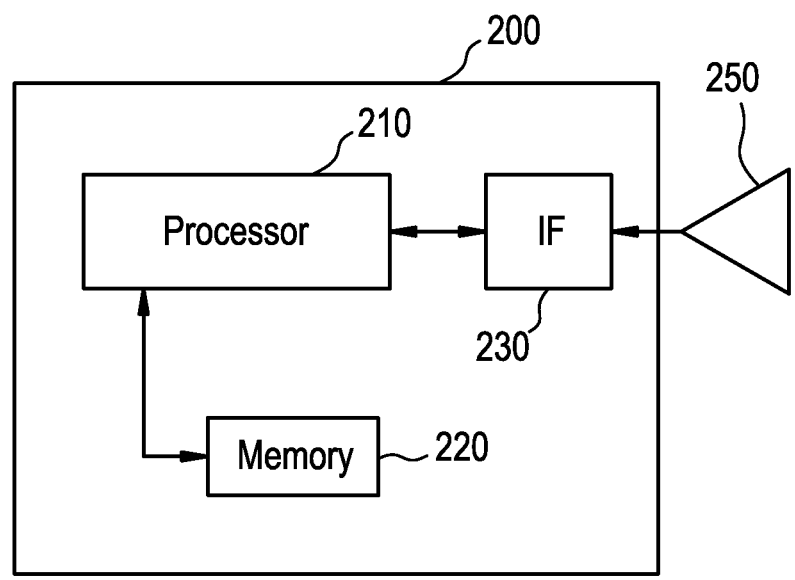
FIG. 3 illustrates an example of the UE in FIG. 1 according to an example embodiment.

FIG. 3 illustrates one example of the UE 200. As shown, the UE 200 includes a processor 210, connected to a memory 220, various interfaces 230, and an antenna 250. As will be appreciated, depending on the implementation of the UE 200, the UE 200 may include many more components than those shown in FIG. 3. However, it is not necessary that all of these generally conventional components be shown in order to disclose the illustrative embodiment.

Memory 220 may be a computer readable storage medium that generally includes a random access memory (RAM), read only memory (ROM), and/or a permanent mass storage device, such as a disk drive. Memory 220 also stores operating system and any other routines/modules/applications for providing the functionalities of the UE 200 (e.g., functionalities of a UE, methods according to the example embodiments, etc.). These software components may also be loaded from a separate computer readable storage medium into memory 220 using a drive mechanism (not shown). Such separate computer readable storage medium may include a disc, tape, DVD/CD-ROM drive, memory card, or other like computer readable storage medium (not shown). In some embodiments, software components may be loaded into memory 220 via one of the various interfaces 230, rather than via a computer readable storage medium.

Processor 210 may be configured to carry out instructions of a computer program by performing the basic arithmetical, logical, and input/output operations of the system. Instructions may be provided to processor 210 by memory 220.

The various interfaces 230 may include components that interface the processor 210 with an antenna 250, or other input/output components. As will be understood, the interfaces 230 and programs stored in the memory 220 to set forth the special purpose functionalities of the UE 200 will vary depending on the implementation of the first device.

For the purposes of explanation only, the embodiments will be described with respect to the Long Term Evolution (LTE) standard. Accordingly, the well-known terminology associated with LTE will be used describing the embodiments.

Next, operation according to an example embodiment will be described.

In one embodiment, resources are reserved for transmission of an acknowledgement, and/or to monitor for reception of an acknowledgement, at at least one specific intermediate point(s) in time during a set of repetitions of a downlink or uplink data transmission. The location (in time) of these intermediate points can be, for example, signaled (e.g., to the UE 200 as part of RRC configuration, prior to the data transmission) or pre-defined in specifications setting forth the wireless communication protocols. The location in time may be indicated relative to a time of the data transmission.

For downlink repetition (e.g., on a physical downlink shared channel (PDSCH)) by the ENB 200, the physical uplink control channel (PUCCH) resources that the UE 200 should use to send an acknowledgement (ACK) are determined implicitly in any well-known manner based on an index of the PDSCH, or on the index of the physical downlink control channel PDCCH or enhanced physical downlink control channel EPDCCH (collectively referred to as the (E)PDCCH). Alternatively, the resources that the UE 200 should may be explicitly determined based on semi-static and/or dynamic signaling or, a combined implicit and explicit signaling may be used.

For uplink repetition (e.g., on a physical uplink shared channel (PUSCH)) by the UE 200, the acknowledgement (ACK) can be sent by the eNB 200 in a form of a new downlink control information (DCI) message. The UE 200 would blind decode for such DCI, which can be sent via the PDCCH or EPDCCH during the intermediate points.

In one embodiment, the time location of the acknowledgement resource is substantially half-way through the period of repetitions of a data packet, or more generally 1/Nth of the way through the period of repetitions of a data packet, where N is an integer. Stated another way, this intermediate point in the data packet repetitions occurs, for example, after a first number of data packet repetitions. As will be appreciated, N may chosen such that the time location of the acknowledgement resource may occur more than once during the period of repetitions. For example, multiple intermediate points may be established. Furthermore, instead of the intermediate points being periodic and therefore separated by a same number of data packet repetitions, the interval between adjacent intermediate points may be different. For example, a first intermediate point may be after the first number of data packet repetitions, and a second intermediate point may be after a second number of data packet repetitions. Both the first and second numbers are less than the total number of times the data packet is expected to be sent. However, the difference between the second number and first number may be equal to or different from the first number.

In some examples of such an embodiment, the time location of the acknowledgement resource is M subframes offset (either earlier or later) from these intermediate positions, in order to avoid colliding with acknowledgement resources reserved for other devices at a same intermediate point (e.g., same the number of repetitions) as the first device; in this case M could be the number of subframes for transmission of the acknowledgement by the other devices. Here, the term device may be used to refer to UEs or eNBs, for example.

At the time location(s) of the acknowledgement resource, the resource may be further defined in terms of frequency and/or code.

It should be appreciated that although sending an acknowledgement would require repetitions, the number of repetitions for such an ACK is low since only a single bit is sent. Hence if the intermediate points are placed at strategic locations, the overall repetitions used would lead to a net gain in spectral efficiency (i.e., less overall resource used to successfully transmit the PDSCH/PUSCH channel).

Figure 4:
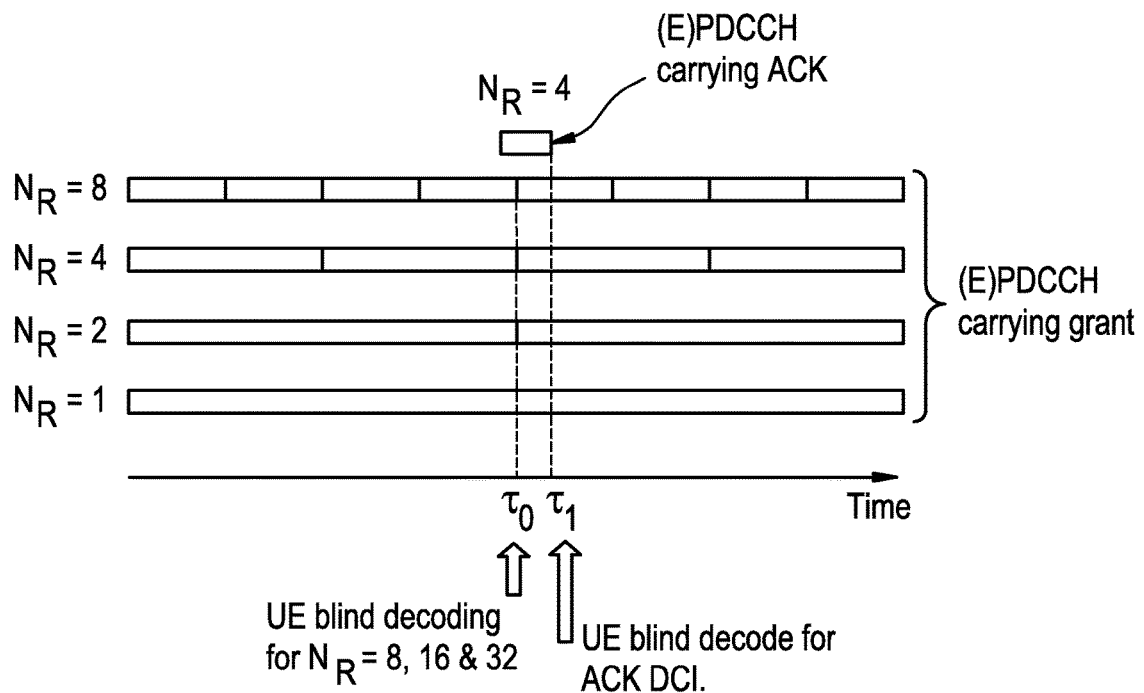
FIG. 4 illustrates an example of the blind decoding offset for different repetitions according to an example embodiment.

As indicated above, the ACK for uplink data packet repetitions may be carried by the (E)PDCCH. Also, it should be appreciated that in addition to the ACK in the downlink, the UE 200 may also have to blind decode the (E)PDCCH for downlink or uplink grant. Therefore, in an embodiment, to avoid increasing the complexity of the UE 200, the end repetition of the (E)PDCCH carrying the ACK may be set to occur at a different subframe to those other (E)PDCCH carrying grant information. This aspect recognizes that the UE 200 is only expected to perform blind decoding on (E)PDCCH when it has accumulated the expected number of repetitive samples. For example in FIG. 4, the (E)PDCCH having different number of repetitions $N_R$, where potential (E)PDCCH candidates that carry grant have $N_R=\{8, 16, 32, 64\}$. The (E)PDCCH carrying ACK has a repetition $N_R=4$. As shown in FIG. 4, at time $\tau 0$, the (E)PDCCH candidates with $N_R=8$, 16, 32 and 64 ends at the same time and so the UE 200 would have to blind detect for candidates that corresponds to these repetitions (assuming each repetition we have limited number of candidates). At $\tau 1$, only the repetitions for (E)PDCCH carrying the ACK end, and so the UE need only to blind decode possible candidates for this (E)PDCCH.

In another embodiment, only ACK is sent transmitted at these intermediate points. For PDSCH termination, the UE 200 would only send an ACK in the PUCCH. For PUSCH termination, the eNB 100 will only send an ACK in the (E)PDCCH. The absence of an ACK would mean that the repetitions should continue until the next intermediate point.

In some embodiments, if the ACK is not sent at the intermediate point(s), negative acknowledgement or non-acknowledgment (NACK) is sent instead; this may improve reliability of detection of the ACK due to the increased Hamming distance between ACK and NACK compared to between ACK and discontinuous transmission (DTX).

Figure 5:
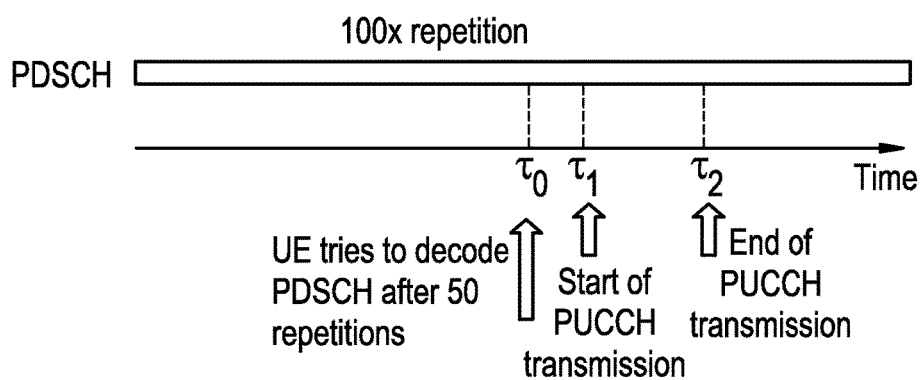
FIG. 5 illustrates an example offset and number of repetitions for sending an acknowledgement according to an example embodiment.

Consider the following example where the UE 200 is in a coverage level where the PDSCH is transmitted with 100 repetitions. The PUCCH requires 5 repetitions to send an ACK. The eNB 100 sets an intermediate point at the $50^{th}$ repetition (e.g., N=2) and would reserve PUCCH resources for 5 subframes some period after the $50^{th}$ repetition. This is shown in FIG. 5, at time $\tau_0$, the UE 100 receives 50 repetitions and tries to decode the PDSCH channel. In this example, the UE 200 successfully decodes the PDSCH and sends an acknowledgement (ACK) over PUCCH on the implicitly reserved uplink resource at $\tau_1$. The difference between $\tau_1$ and $\tau_0$ can be 4 subframes, similar to the timing used in legacy system. The UE transmits 5 repetitions of PUCCH starting at time $\tau_1$ and ending at time $\tau_2$. At time $\tau_2$, the eNB 100 decodes the ACK from the UE 100 and then stops transmitting PDSCH repetitions. Hence, the eNB 100 transmits only a total of 59 PDSCH repetitions (50+4 subframes for UE 200 to decode PDSCH+5 subframes for PUCCH) instead of 100 PDSCH repetitions.

Figure 6:
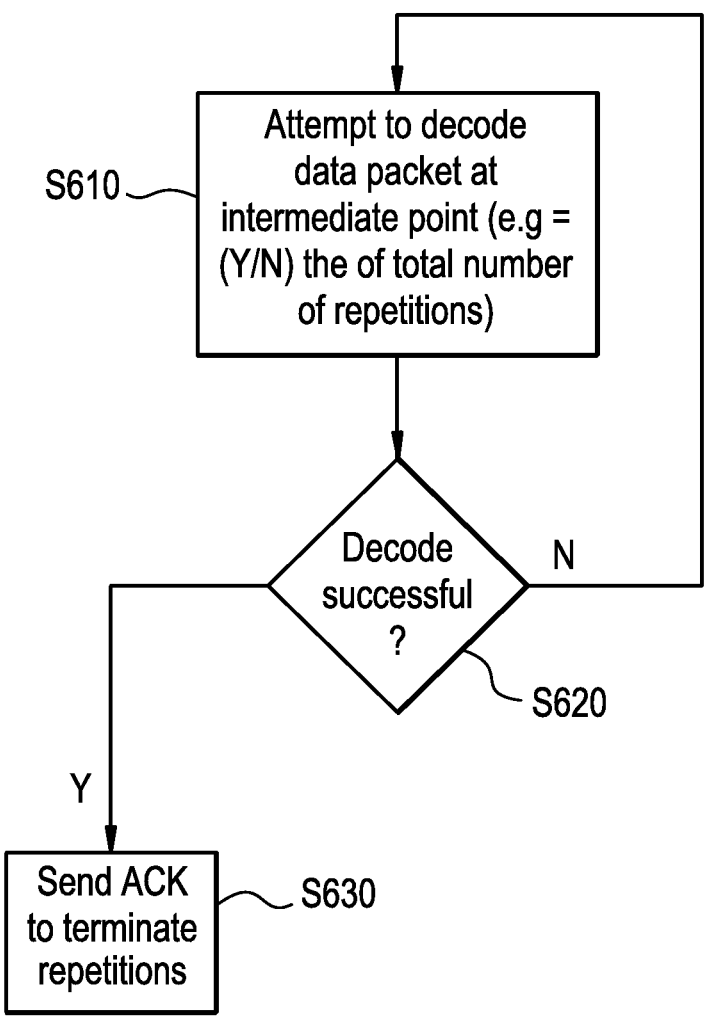
FIG. 6 illustrates a flowchart of a method for terminating repetition of data packet transmissions as performed at the receiving device according to an example embodiment.

FIG. 6 illustrates a flowchart of a method for terminating repetition of data packet transmissions as performed at the receiving device according to an example embodiment. As shown, in step S610, the device (e.g., UE 200 for downlink transmissions or eNB 100 for uplink transmissions) attempts to decode the data packet being repeatedly transmitted at an intermediate point in the repetitions. For example, the first intermediate point may be at a first number of data packet repetitions. The first number may be equal to (1/N)th the total number of repetitions. The device determines in step S620 if the decoding was successful. If so, the device sends an acknowledgement to trigger termination of the repetitions in step S630. If not, processing may return to step S610 for the next intermediate point. For example, a second intermediate point may be at a second number of data packet repetitions. Both the first and second numbers are less than the total number of times the data packet is expected to be sent. However, the difference between the second number and first number may be equal to or different from the first number. If a next intermediate point does not exist, then processing may end.

Figure 7:
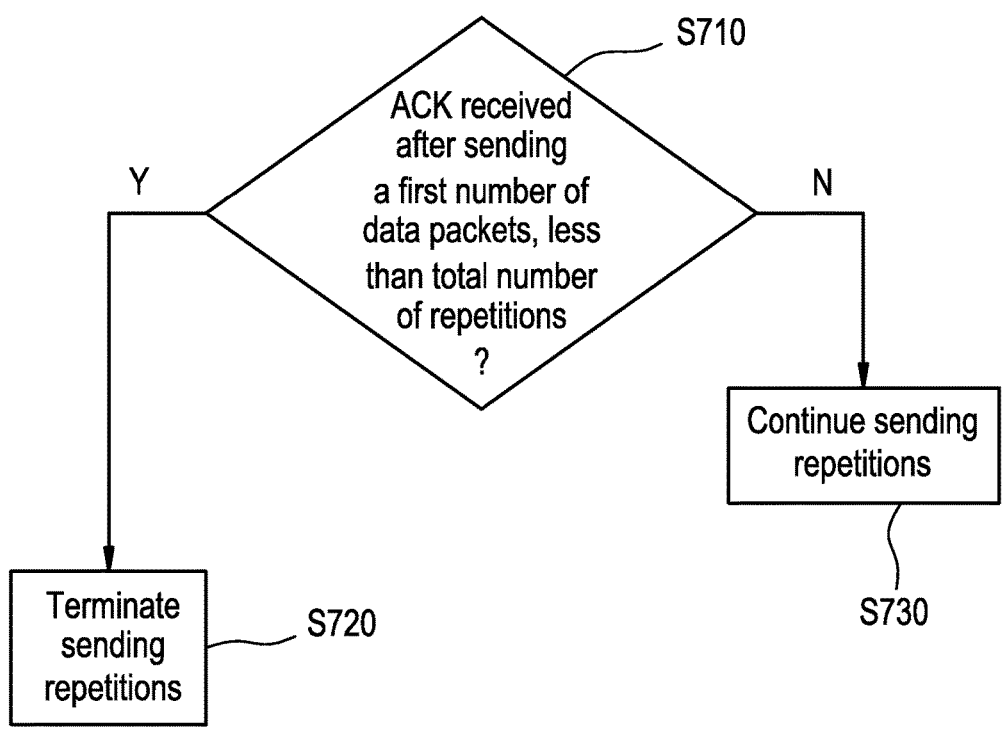
FIG. 7 illustrates a flowchart of a method for terminating repetition of data packet transmission as performed at the sending device according to an example embodiment

FIG. 7 illustrates a flowchart of a method for terminating repetition of data packet transmission as performed at the sending device according to an example embodiment. Here, the device (e.g., UE 200 for uplink transmissions or eNB 100 for downlink transmissions) starts a transmission operation to send a data packet. The transmission operation includes repeatedly sending a data packet. While conducting the transmission operation, the device in step S710 determines if a ACK is received at an intermediate point, e.g., after sending a first number of data packets, less than the total number of repetitions that the data packet will be sent. For example, the first number may be (1/N)th the total number of repetitions. If an ACK is received, then the device terminates performing the repeated sending of the data packet in step S720. However, if the ACK is not received, then in step S730, the device continues performing the repeated sending of the data packet. As will be appreciated, the method of FIG. 7 may be repeated for other intermediate points besides the (1/N)th intermediate point or first (1/N)th intermediate point. For example, the method may be repeated after a second number of data packets have been sent. The second number is greater than the first number, but less than the total number of repetitions. Also, a different between this second number and the first number may be equal to or different from the first number.

As will further be appreciated, the embodiments of the methods illustrated in FIGS. 6 and 7 may be altered according to the other embodiments previously described in this disclosure.

By implementing one of the embodiments, the number of repetitions for sending a data packet may be reduced, thus improving spectral efficiency.

The invention being thus described, it will be obvious that the same may be varied in many ways. Such variations are not to be regarded as a departure from the invention, and all such modifications are intended to be included within the scope of the invention.

What is claimed is:

1. A method for terminating repetition of data packet transmission, comprising:
    first determining, at a device, whether a data packet is successfully decoded after a first number of data packet repetitions have been received, the first number being less than a total number of data packet repetitions to be sent to the device;
    first sending, by the device, an acknowledgement if the first determining determines the data packet was successfully decoded, the first sending occurring before the total number of data packet repetitions has been received; and
    second determining, at the device, whether the data packet is successfully decoded after a second number of data packet repetitions have been received, the second number being greater than the first number.

2. The method as in claim 1, further comprising:
    second sending, by the device, an acknowledgement if the second determining determines the data packet was successfully decoded, the second sending occurring before the total number of data packet repetitions has been received, wherein
    the second number is less than the total number of data packet repetitions to be sent to the device.

3. The method of claim 1, wherein a difference between the second number and the first number is different from the first number.

4. The method of claim 1, further comprising:
    receiving, at the device, an indication of the first number and the second number prior to receiving the data packet.

5. The method of claim 1, further comprising:
    receiving, at the device, an indication of the first number prior to receiving the data packet.

6. The method of claim 1, wherein the first sending sends the acknowledgement a second number of times.

7. The method of claim 1, wherein the first sending sends the acknowledgement offset in time from when the first number of data packet repetitions has been received.

8. The method of claim 1, further comprising:
    sending a negative-acknowledgement, by the device, if the first determining determines the data packet was not successfully decoded.

9. The method of claim 1, further comprising:
    receiving, at the device, an indication that at least one transmission resource for the first sending has been reserved, the transmission resource characterized by at least one of time, frequency and code.

10. The method of claim 1, wherein the device is one of a network device and a user device.

11. The method of claim 1, wherein a difference between the second number and the first number is equal to the first number.

12. A method for terminating repetition of data packet transmission, comprising:
    starting, at a device, a transmission operation to send a data packet, the transmission operation being configured for sending the data packet for a first number of repetitions;
    first determining, at the device, whether an acknowledgement has been received after a second number of repetitions of the data packet have been sent, the second number being less than the first number;
    first terminating, by the device, the transmission operation before reaching the first number of repetitions if the first determining determines that the acknowledgement has been received; and
    second determining, at the device, whether an acknowledgement has been received after a third number of repetitions of the data packet have been sent, the third number greater than the second number.

13. The method as in claim 12, further comprising:
    second terminating, by the device, the transmission operation before reaching the first number of repetitions if the second determining determines that the acknowledgement has been received, wherein
    the third number is less than the first number.

14. The method of claim 12, wherein a difference between the third number and the second number is equal to the second number.

15. The method of claim 12, further comprising:
    sending, by the device, an indication of the second number and the third number before the starting.

16. The method of claim 12, wherein the device is one of a network device and a user device.

17. The method of claim 12, further comprising:
    sending, by the device, an indication of the second number before the starting.

18. The method of claim 12, further comprising:
    signaling, by the device, that at least one transmission resource for sending the acknowledgement has been reserved before the starting, the transmission resource characterized by at least one of time, frequency and code.

19. An apparatus for terminating repetition of data packet transmission, comprising:
    a processor configured to first determine whether a data packet is successfully decoded after a first number of data packet repetitions have been received, the first number being less than a total number of data packet repetitions to be sent to the device;
    the processor configured to first send an acknowledgement if the processor determines the data packet was successfully decoded, the first sending occurring before the total number of data packet repetitions has been received; and
    the processor configured to second determine whether the data packet is successfully decoded after a second number of data packet repetitions have been sent, the second number being greater than the first number.

20. An apparatus for terminating repetition of data packet transmission, comprising:
    a processor configured to start a transmission operation to send a data packet, the transmission operation for sending the data packet for a first number of repetitions;
    the processor configured to first determine whether an acknowledgement has been received after a second number of repetitions of the data packet have been sent, the second number being less than the first number;

the processor configured to terminate the transmission operation before reaching the first number of repetitions if the processor determines that the acknowledgement has been received; and the processor configured to second determine whether an acknowledgement has been received after a third number of repetitions of the data packet have been sent, the third number being greater than the second number.

\* \* \* \* \*